Patented Aug. 4, 1936

2,049,832

UNITED STATES PATENT OFFICE 2,049,832

ACOUSTIC MATERIAL

John Dean, San Francisco, Calif., assignor of one-fourth to Daniel Campbell

No Drawing. Application April 10, 1934, Serial No. 719,981

3 Claims. (Cl. 106—23)

This invention relates to new and useful improvements in acoustic materials.

The primary object of this invention is to provide a plastic material which possesses a high coefficient of sound absorption and great tensile strength which may be trowelled or sprayed onto a surface to act as a covering or finished coat for the same, and which may be cast, rolled, or extruded into any desired forms, such as boards, sheets, solid or hollow blocks, etc.

A further object of the invention is to provide an acoustic material which, when rendered plastic, will possess the characteristic of setting or hardening.

Other objects and advantages of the invention will become apparent as the description proceeds.

Ingredients which are compounded to form my acoustic material may be arranged in three groups. The first group consists of ingredients which may be severally or collectively employed for forming the bulk or body of the mass. The second group will consist of any suitable binder which will bond the particles of the fibrous body by means of the elastic threads and which will leave the pores of the fibrous particles unsealed. The third group will consist of any suitable plastic retarding agent which will control the speed of setting or hardening of the material.

The bulk or body of the mass preferably will be formed of any desired combination or selection of the following sound absorbing and deadening ingredients:

Granulated naval cork.

Diatomaceous earth in granular form.

Woods or barks having cellular formation, such as sawdust, wood pulp, or fibre or the like.

Deep sea sponge.

Granulated pumice.

Powdered magnesia asbestos or asbestos in any other form.

The type of binder which I have found to most satisfactorily meet the requirements consists of a solution of rubber. This rubber binding agent probably is the most important ingredient of the composition as it possesses numerous novel and unexpected characteristics when compounded with fibrous materials.

When it becomes desirable to control or retard the setting of the plastic material formed by any one or more of the above mentioned fibrous constituents compounded with the rubber binder, I prefer to employ a small percentage of washing soda in liquid form which will act to slow up the drying of the plastic mass. It will be understood, however, that any one of the many known forms of retarding agents may be employed.

As a specific example of the preferred form of this invention, I will mix eight (8) parts of granulated naval cork, four (4) parts of granulated pumice and one (1) part of powdered magnesia asbestos with one (1) gallon of 7% rubber solution to thirteen (13) pounds of dry aggregates.

The speed and percentage of the coefficient of sound absorption of my acoustic material may be very accurately regulated by varying the percentages and numbers of the dry aggregates compounded and the thickness of the material in its final hardened form. It may be necessary to eliminate one and sometimes two of the ingredients above set forth in the preferred embodiment of the invention under certain conditions to attain a desired result in a structure or room being treated. Variations in the coefficient of sound absorption of this material have been accomplished to as high as 20% of the coefficient obtained by the mixture in the specific percentages above specified. It is believed that this ability to fully control the effects desired has never before been obtained to the extent possible with this composition of matter.

As stated above, the binding agent will consist of approximately one (1) gallon of 7% rubber solution to thirteen (13) pounds of dry aggregate. This quantity may be varied in accordance with the variations resorted to in combining the different fibrous ingredients constituting the base or body of the material. Rubber solvents may be added to the plastic material, before setting or hardening of the same to produce a wetter plastic mass. Rubber solvents also may be added to the mass, prior to use or after being placed on the surface or in the mold to permit retempering when too much evaporation has taken place or the plastic mass has become too hard to spread with tools into the desired formation. During the setting or hardening of the material, approximately 93% of the contents of the binding agent will evaporate with the result that the rubber binder will shrink into thin threads which will bond together the various particles of the fibres and will leave a greater majority of the pores of the same free to absorb sound waves. It, of course, will be recognized that rubber also is a sound absorbing material. The evaporation of the majority of the binding material leaves an extremely porous mass with the particles tied together with threads of rubber. The fine rubber threads in addition to tying the various particles together, will act to a considerable extent to break up the sound vibrations, due to the elasticity of the threads. The mass being extremely porous, will break up the sound vibrations by quickly absorbing the same into the pores of the mass. Precast slabs of desired size and form may be made from this plastic material and applied on finished surfaces by first treating the surfaces with a washing of rubber solvent and then a coating of rubber solution. This solvent and rubber solution will cause the acoustic slabs to adhere to the finished surface. It also has been determined that precast slabs, sheets, boards or blocks formed from my plastic material may be sprayed with rubber dissolved into a solution of considerable plasticity or density. This rubber solution should be sprayed on the precast objects after they have dried. The advantages of this rubber coating are numerous. The coating eliminates suction in the object to a very great extent and when the coated object takes the form of a board or slab employed as a backing for plaster, the elimination of suction in the board will allow the plasterer time to complete the trowelling of the plaster in the proper manner. This rubber coating also will eliminate warping or buckling of the board or object which ordinarily is caused by expansion or contraction of the board resulting from intense suction of moisture from the plaster applied to the board and the evaporation of the moisture absorbed by the board. The rubber coating also will eliminate oil spots as would result if an oil base or emulsified asphalt base water-proofing compound were used in controlling the suction of the board.

Any desired ornamental designs may be cast in molds and applied in the same manner as precast slabs. The tinting or coloring of the dry mass, the binding solution, the wet mass, or the precast slabs may be done by aniline dyes being incorporated in the mixing of the mass or, in the case of the finished surface, by the application of a fine spray. These methods eliminate the possibility of reducing the porosity of the materials incorporated.

Another use other than for acoustic purposes is gained by the omission of the pumice ingredient from the preferred composition. The omission of the pumice permits the material to be used in plastering or covering gymnasium walls or the walls of any room or building where persons or animals are liable to abrasion or shock by violent contact with the walls. The mass, with the pumice omitted, would consist of granulated cork, or sawdust, or both, asbestos and a rubber solution in a sufficient quantity to make a plastic mass. This plastic mass may be applied to the necessary thickness and will result in a wall having an extremely soft, elastic, shock absorptive, tough and durable surface.

It is to be understood that the dry aggregates are mixed and bagged for shipment to the point of use where they are rendered plastic by the addition of the rubber solution at the time of use. It also is to be understood that the specific example given above may be varied as to the proportions of the different ingredients and as to the kinds of ingredients compounded.

Having thus described my invention, I claim:

1. A composition for making acoustic material comprising granulated naval cork, eight (8) parts, granulated pumice, four (4) parts, powdered magnesia asbestos, one (1) part, and one (1) gallon of 7% rubber solution to thirteen (13) pounds dry aggregates.

2. A composition for making acoustic material comprising a granular aggregate formed of sound absorbing and deadening ingredients in dry form and a binding agent consisting essentially of rubber solution in an amount equal to substantially one gallon of solution per thirteen pounds of aggregate, said solution being approximately 7% rubber, the moisture content of the rubber solution evaporating off during the setting of the material to leave the particles of the aggregate bonded together by thin elastic threads, and a majority of the pores of said particles being exposed to absorb sound waves.

3. A composition for making acoustic material comprising granulated naval cork, granulated pumice, powdered magnesia asbestos, and approximately one gallon of 7% rubber solution to thirteen pounds of dry aggregates.

JOHN DEAN.